United States Patent [19]  [11] 3,769,095
Schmidt  [45] Oct. 30, 1973

[54] BATTERY CASE CONSTRUCTION
[75] Inventor: Jacob E. Schmidt, Twp. of Little Falls, Passaic Cty., N.J.
[73] Assignee: McGraw-Edison Company, Elgin, Ill.
[22] Filed: Apr. 10, 1972
[21] Appl. No.: 242,670

[52] U.S. Cl. .................................. 136/166, 136/171
[51] Int. Cl. ............................................ H01m 1/02
[58] Field of Search ..................... 136/166, 171, 173, 136/176, 181, 79

[56] References Cited
UNITED STATES PATENTS
| | | | |
|---|---|---|---|
| 3,167,458 | 1/1965 | Brazell | 136/166 |
| 3,463,672 | 8/1969 | Schmidt | 136/166 |
| 3,623,917 | 11/1971 | Chassoux | 136/171 |
| 3,692,588 | 9/1972 | Chamodon | 136/171 |

Primary Examiner—Anthony Skapars
Attorney—George H. Fritzinger

[57] ABSTRACT

A battery case assembly accomodating any desired number of individual cell containers of rectangular metallic construction comprises plastic side cover plates on the individual containers having interengaging flanged edges fitting between the containers. The successive side cover plates are locked together by clasps hooked into undercut edges along the flanged sides of the plates. Tie bars between containers are anchored at their ends in the side cover plates to prevent bulging of the side cover assembly, and metal bosses extending from the sides of the containers engage openings in the side cover plates to permit the cells to be picked up by handles secured to the side cover assembly.

6 Claims, 4 Drawing Figures

PATENTED OCT 30 1973 3,769,095

BATTERY CASE CONSTRUCTION

This invention is an improvement in my U.S. Pat. No. 3,463,672, dated Aug. 26, 1969, enabling any number of battery cells with rectangular metal cases to be grouped together into a unitary case construction.

An object is to provide plastic side cover plates for individual metal cell containers which can be interlocked to provide a sturdy carrying case for a battery of any desired number of cells.

Another object is to provide a battery case construction which enables any desired number of individual metal case cell containers to be secured together into an integral construction in a durable, simple and economical manner.

These and other objects and features of the invention will be apparent from the following description and the appended claims.

In the description of my invention, reference is had to the accompanying drawings, of which:

Figure 3:
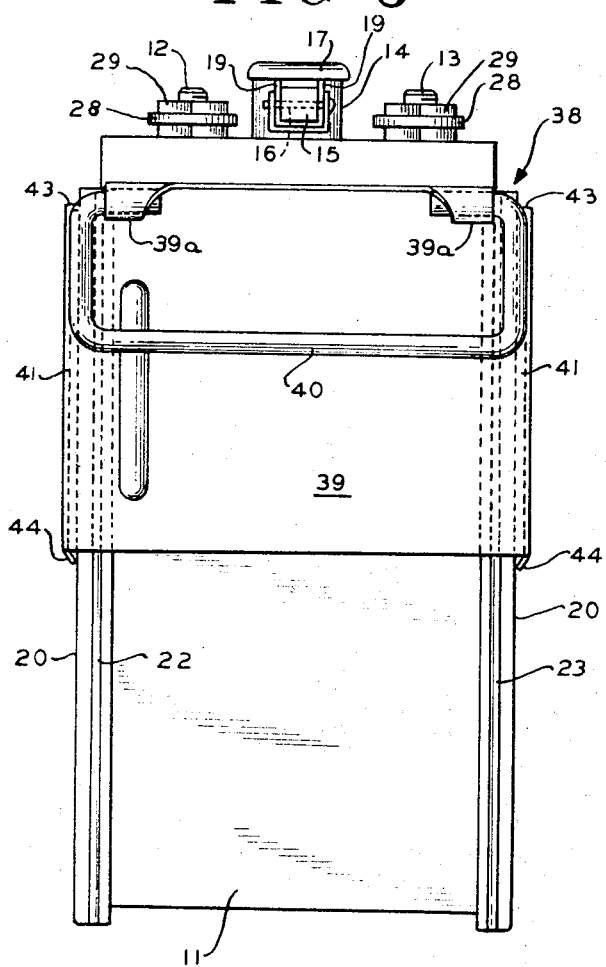
Figure 4:
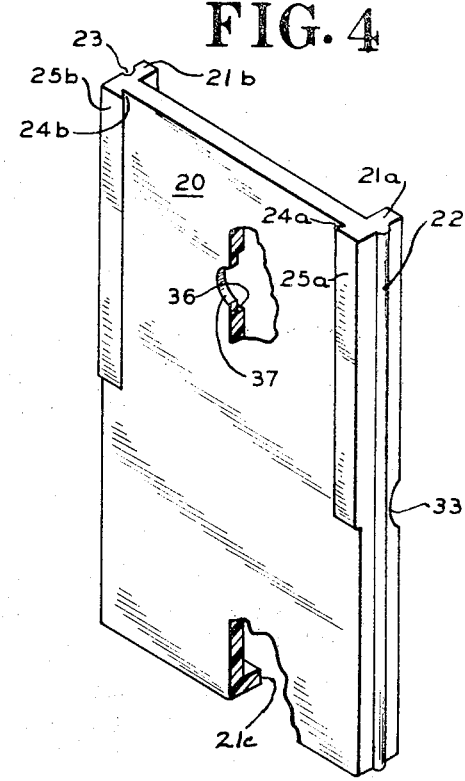
FIG. 4 is a perspective view, partly broken away, of one of the side cover plates for an individual cell according to the invention.

The battery shown in the accompanying drawings comprises a plurality of individual cells 10 of which four are shown by way of illustrative example. The individual cells have identical containers 11 of a metal construction and of a rectangular shape as viewed from the top sides. Extending through openings in the top wall of each container are posts 12 and 13 suitably insulated from the top wall forming positive and negative terminals. Also, fitted into the top wall of each container is a plastic filler opening 14 (FIG. 3) from one side of which extends a radial arm 15. Hinged to this radial arm on a cross pin 16 is a filler cap 17 of suitable metal construction having an arm 18 at one side with turned down lugs 19 pivoted on the cross pin 16. Each cell comprises typically a group of positive and negative plates with intervening insulating spacers, of which the positive and negative plates are connected respectively to the positive and negative terminals 12 and 13. The internal construction of the cells need not however be herein described since the present invention relates only to the exterior case construction of the battery.

Figure 1:
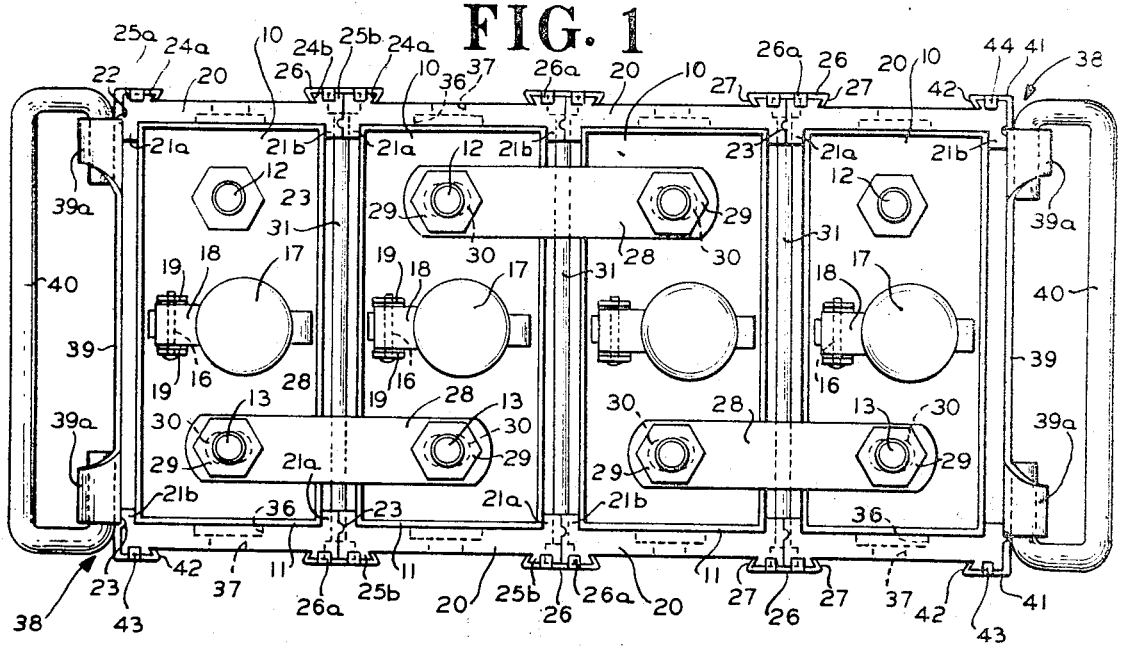
FIG. 1 is a top plan view of a battery of individual cells joined into a unitary construction in accordance with the present invention.
Figure 2:
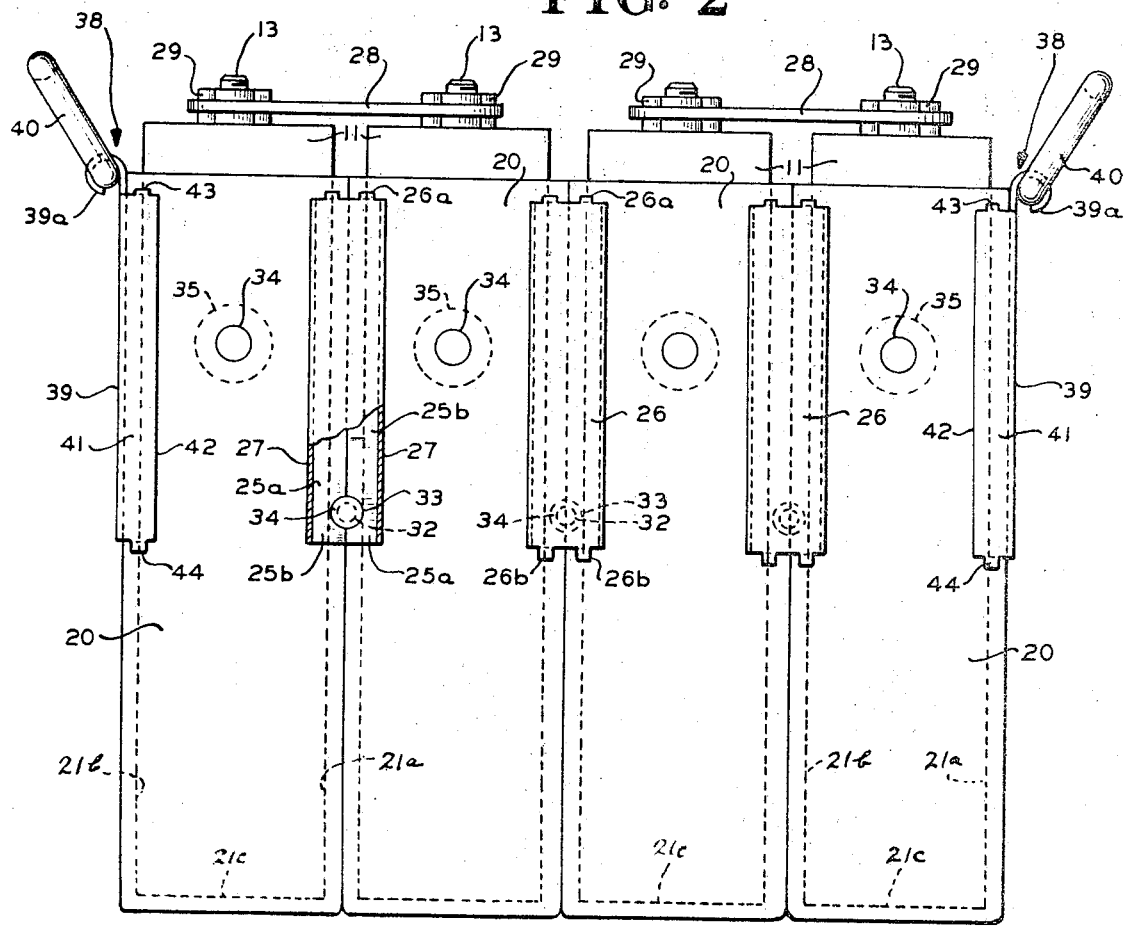
FIGS. 2 and 3 are side and end elevations respectively of this battery.

The exterior battery case construction accomodates in accordance with the present invention any number of individual cells. The cells are carried in a row with uniform spacing therebetween. This case construction comprises individual side cover plates 20 of suitable plastic material each having inwardly extending flanges 21a and 21b along the opposite vertical side edges thereof and an inwardly extending flange 21c along the bottom edge thereof. These side cover plates embrace the opposite sides and the bottom of each of the cells. In one end wall of each side cover plate 20 there is a rib 22 and in the other end wall of the same plate there is a corresponding groove 23 so that when two cover plates are abutted side-by-side they will interengage at the contiguous wall of the flanged sides of the plates. These side cover plates also have vertically extending undercut edges 24a and 24b in their exterior walls adjacent to the flanged sides 21a and 21b of the respective cover plates. Preferably, these undercut edges are formed by providing the side cover plates with exterior ribs 25a and 25b as shown. The two adjacent ribs 25a and 25b of each successive pair of side cover plates 20 are bridged by a clasp 26 having hook-shaped side flanges 27 which interlock with the undercut edges 24a and 24b in a tight engagement as the clasps are pressed downwardly onto the pairs of ribs. Preferably, the ribs 25a and 25b are located along the upper portion of the battery and extend about half the height of the battery as shown in FIG. 2. The clasps 26 are of a bar shape extending the full length of the respective ribs and have inwardly turned lugs 26a and 26b at the top and bottom thereof which after the clasps have been pressed the full length of the ribs are bent inwardly to lock the clasps in place.

The successive cells are oriented in the block arrangement so that the terminal posts opposite to each other of adjoining cells are of opposite polarity to enable the same to be interconnected easily by metal straps 28 secured firmly to threaded end portions of the posts by nuts 29. Preferably, the straps have slightly oblong openings 30 receiving the posts to permit the successive cells to be separated by a spacing established by the width of the pair of flanges 21a and 21b of adjoining side cover plates 20 between the cells.

The side cover assemblies are joined crosswise of the battery by tie bars 31 about midway the height of the battery but within the level of the ribs 25a and 25b as shown in FIG. 2. In the contiguous side walls of the side cover plates 20 are round notches providing circular openings 32 when the successive side cover plates are clamped together by the clasps. Concentric with these openings are notches forming a circular recess 33 at the junction line between each pair of side cover plates. The tie bars 31 have cylindrical heads 34 at the ends to fit these circular recesses 33 flush with the outside wall of the ribs 25a and 25b. Thus, the tie bars hold the side cover assemblies together from bulging outwardly and the heads of the tie bars are covered by the clasps 26.

In each opposite side wall of each container 11 there is secured as by welding or riveting a short post 34 provided with a concentric base portion 35. Likewise, in each side cover plate there is an inner larger opening 36 receiving the base portion 35 and a smaller extending opening 37 receiving the post 34. These posts are preferably set up about midway the height of the rib portions of the side cover plates as shown also in FIG. 2. The engagement of the posts 34-35 with the openings 36-37 of the side cover plates anchors the side cover plates securely to the individual cases against vertical displacement so that the whole weight of each cell is not supported merely by the bottom flanges 21c. This permits the battery to be carried by the side cover assembly as is herein next described.

At the ends of the block of cells there are handle structures 38 comprising metal plates 39 having curled lugs 39a at the top in which are pivoted bail-type handles 40. At the opposite sides of the plates 39 at right angles thereto there are flanges 41 which embrace the ribs 25a and 25b of the end cover plates 20 of the battery. These flanges have inwardly bent hooks 42 along their outer edges which slidably engage the undercut edges 24a and 24b of these ribs as the plates are pressed downwardly in place along the ends of the outer cover plates. After the handle structures are so pressed into place lugs 43 and 44 at the top and bottom of the flanges 41 are bent inwardly to lock the handle structure to the ribs 25a and 25b so that the block of cells can be carried by the handles 40.

The particular embodiment of my invention herein particularly shown and described is intended to be illustrative and not necessarily limitative of my invention, since the same is subject to changes and modifications without departure from the scope of my invention, which I endeavor to express according to the following claims.

I claim:

1. A battery comprising a preselected number of individual cells each having a metal container of rectangular shape as viewed from the sides and top permitting the cells to be set in a row with uniform spacing therebetween, a pair of outer plastic side cover plates for each cell having inwardly extending flanges along the sides embracing the container of the cell, the outside walls of said flanges of each side cover plate being complimentarily shaped causing the successive side wall covers to interengage with each other, the exterior wall of each plastic side cover plate having vertical undercut edges adjacent the opposite sides of the plate throughout an upper portion of the plates, strap-like clasps having hook-shaped flanges along the opposite sides thereof engaging respective pairs of adjacent edges for rigidly connecting said side cover plates together into an integral side cover assembly at each side of said row of cells with the adjoining flanges of the successive side cover plates establishing the spacing between adjacent cells, and means clamping said side cover assemblies together.

2. The battery set forth in claim 1 wherein each of said side cover plates has exterior ribs along said flanged edges of the plates providing said undercut edges at the sides of the ribs away from the respective side edges of the plates, and wherein said clasps have lugs bent inwardly from the top and bottom thereof embracing the ends of said ribs to lock said clasps in place on said side cover plates, including handle structures at the ends of said battery having hooked flanges embracing the ribs of the end cover plates of the battery for enabling the cells of the battery to be carried via said side cover plate assemblies.

3. The battery set forth in claim 1 including tie bars between adjacent cells anchored at the ends jointly into the contiguous flanges of the respective pairs of adjoining side cover plates to retain the side cover plates against the battery cell container.

4. The battery set forth in claim 1 including tie bars between adjacent cells anchored at the ends into the contiguous flanges of the respective pairs of adjoining side cover plates of the battery, wherein each tie bar has a head at each end of enlarged cross section, and the contiguous walls of the flanges of the adjoining side cover plates are notched to receive said bars at the parting line between the plates and are recessed in the outer wall to receive the heads of said tie bars in locking engagement with each pair of plates when said interlocking clasps are in place.

5. The battery set forth in claim 4 wherein said recesses receiving the heads of said tie bars are covered by said clasps when the clasps are in place.

6. The battery set forth in claim 1 including an aperture in each of the side wall cover plates, and an integral boss on the respective side of each cell container engaging said aperture to lock the respective cover plate against displacement in a vertical plane relative to the cell container.

* * * * *